(12) United States Patent
Lenoir et al.

(10) Patent No.: US 12,062,955 B2
(45) Date of Patent: Aug. 13, 2024

(54) METHOD FOR WELDING WITHOUT ADDITION OF MATERIAL

(71) Applicant: NIDEC PSA EMOTORS, Carrieres sous Poissy (FR)

(72) Inventors: Romaric Lenoir, Le Port Marly (FR); Cyril Moya, Chatou (FR)

(73) Assignee: NIDEC PSA EMOTORS

( * ) Notice: Subject to any disclaimer, the term of this patent is extended or adjusted under 35 U.S.C. 154(b) by 318 days.

(21) Appl. No.: 17/621,175

(22) PCT Filed: Jul. 1, 2020

(86) PCT No.: PCT/FR2020/051151
§ 371 (c)(1),
(2) Date: Dec. 20, 2021

(87) PCT Pub. No.: WO2021/009428
PCT Pub. Date: Jan. 21, 2021

(65) Prior Publication Data
US 2022/0376589 A1 Nov. 24, 2022

(30) Foreign Application Priority Data

Jul. 15, 2019 (FR) ...................................... 1907978

(51) Int. Cl.
| | | |
|---|---|---|
| *H02K 15/00* | (2006.01) | |
| *B23K 31/02* | (2006.01) | |
| *H02K 3/28* | (2006.01) | |
| *B23K 101/38* | (2006.01) | |

(52) U.S. Cl.
CPC ......... *H02K 15/0081* (2013.01); *B23K 31/02* (2013.01); *H02K 3/28* (2013.01); *B23K 2101/38* (2018.08)

(58) Field of Classification Search
CPC .... H02K 3/28; H02K 15/001; H02K 15/0081; B23K 31/02; B23K 2101/38
USPC .......................................................... 310/208
See application file for complete search history.

(56) References Cited

U.S. PATENT DOCUMENTS

| | | | |
|---|---|---|---|
| 10,510,464 B1 * | 12/2019 | Gronowski | .............. H02K 3/12 |
| 11,024,997 B2 * | 6/2021 | Wittmann | ............ H01R 13/113 |
| 2014/0338183 A1 | 11/2014 | Nishiyama et al. | |
| 2017/0257002 A1 * | 9/2017 | Ishizuka | ............ H02K 15/0068 |
| 2018/0182507 A1 * | 6/2018 | Gronowski | .............. H02K 3/14 |

(Continued)

FOREIGN PATENT DOCUMENTS

| | | |
|---|---|---|
| DE | 102017200688 A1 | 1/2018 |
| EP | 2800246 A1 | 11/2014 |
| WO | 2017159114 A1 | 9/2017 |

OTHER PUBLICATIONS

International Search Report for PCT/FR2020/0051151 mailed Sep. 14, 2020.
Written Opinion for PCT/FR2020/0051151 mailed Sep. 14, 2020.

*Primary Examiner* — Rashad H Johnson
(74) *Attorney, Agent, or Firm* — Sandberg Phoenix & von Gontard P.C.

(57) ABSTRACT

A method for welding a plurality of strands of one or more electrical conductors comprises at least the following steps: (a) preparing the strands to be welded such that at least the free ends of adjacent strands are axially offset by a non-zero distance d; and (b) melting the free ends of the strands thus arranged in order to weld them without addition of material.

19 Claims, 7 Drawing Sheets

(56) References Cited

U.S. PATENT DOCUMENTS

| | | | | |
|---|---|---|---|---|
| 2019/0165493 | A1* | 5/2019 | Warashina | H01R 4/187 |
| 2019/0319375 | A1* | 10/2019 | Scharkowski | H01R 43/0207 |
| 2019/0393664 | A1* | 12/2019 | Katou | B23K 37/0426 |
| 2019/0393665 | A1* | 12/2019 | Katou | H01R 43/0263 |
| 2020/0343795 | A1* | 10/2020 | Stöck | H02K 3/14 |
| 2021/0044066 | A1* | 2/2021 | Steinberg | H01R 4/029 |
| 2021/0359579 | A1* | 11/2021 | Fukuda | H02K 3/12 |
| 2022/0060075 | A1* | 2/2022 | Baranowski | H02K 15/0428 |
| 2022/0238256 | A1* | 7/2022 | McIntyre | H01B 12/06 |
| 2022/0305580 | A1* | 9/2022 | Mori | B23K 9/23 |
| 2022/0376589 | A1* | 11/2022 | Lenoir | B23K 9/167 |
| 2023/0040799 | A1* | 2/2023 | Yamada | H02K 15/067 |
| 2023/0231327 | A1* | 7/2023 | Khu | H01R 4/023 |
| | | | | 439/877 |
| 2023/0317371 | A1* | 10/2023 | Katsuya | H01F 41/10 |

\* cited by examiner

METHOD FOR WELDING WITHOUT ADDITION OF MATERIAL

CROSS-REFERENCE TO RELATED APPLICATIONS

This application is the US National Stage under 35 USC § 371 of International Application No. PCT/FR2020/051151, filed 1 Jul. 2020 which claims priority to French App. No. 1907978 filed on Jul. 15, 2019, the content of each (text, drawings and claims) being incorporated here by reference.

BACKGROUND

The present invention relates to a method for welding electrical conductors in a stator of a rotating electrical machine.

The invention relates more particularly to synchronous or asynchronous AC machines. It relates in particular to traction or propulsion machines for electric motor vehicles (Battery Electric Vehicle) and/or hybrid motor vehicles (Hybrid Electric Vehicle—Plug-in Hybrid Electric Vehicle), such as individual cars, vans, trucks or buses. The invention also applies to rotating electrical machines for industrial and/or energy production applications, in particular naval, wind or aeronautical power applications.

Welding several adjacent electrical conductors in a so-called raised edge configuration, that is to say, with electrical conductors that are at the same height, leads to welds that are difficult to penetrate, and which therefore have a small current flow section between the two electrical conductors that are welded together.

Too great an increase in the welding energy aimed at increasing the penetration of the weld leads to destruction of the electrical conductors by accumulation of energy in the end to be welded, then melting and collapse of the latter.

One possibility for increasing the current flow section is to add material. However, technologies with addition of metal, for example Metal Inert Gas (MIG) technology, lead to high energy levels, which can also lead to the destruction of the assembly.

There is a need to simply weld electrical conductors together without running the risk of destroying them during the welding operation.

SUMMARY

Welding Method

A method is disclosed for welding a plurality of strands of one or more electrical conductors, the method comprising at least the following steps:
  preparing the strands to be welded such that at least the free ends of adjacent strands are axially offset, in particular along the axis of elongation of the strands, by a non-zero distance d, and
  melting the free ends of the strands thus arranged in order to weld them without addition of material,
    wherein, the layer of material having melted has a variable thickness of greater thickness between 100% and 300% of the thickness of a strand, and preferably between 120% and 200% of the thickness of a strand.

Another object is a method for welding a plurality of strands of one or more electrical conductors, comprising at least the following steps:
  preparing the strands to be welded such that at least the free ends of adjacent strands are axially offset, along the axis of elongation of the strands, by a non-zero distance d and such that all the strands of one or more electrical conductors to be welded together are arranged symmetrically with respect to a plane of symmetry,
  melting the free ends of the strands thus arranged in order to weld them without addition of material.

"Axial offset" means the offset of a strand along its axis of elongation.

The organized axial offset of the free ends of the strands of the electrical conductor(s) makes it possible to have excess material in order to be able to carry out the welding without requiring the addition of additional material.

Step (a) of preparing the strands to be welded can be done using strands of different lengths.

Alternatively, the preparation step (a) can be carried out by machining the free ends of the strands to be welded. The free ends of the strands are then machined at different heights. The free ends of the strands can be machined perpendicular to their axis of elongation. Alternatively, the free ends of the strands are machined obliquely with respect to their axis of elongation.

"Machining" means subjecting a part to the action of one or more machine tools in order to remove material. The machining can be done by milling, grinding or by cutting, for example using a clamp.

Microchips resulting from machining by cutting have a larger size than those resulting from machining by milling or grinding. They are then easier to eliminate. As a result, pollution by micro-chips is thus limited.

The distance d may be between 5% and 120% of the thickness e of the strand, preferably between 10% and 100% of the thickness e of a strand, better still between 15% and 80% of the thickness e of a strand. The thickness e of a strand is defined as its dimension in the radial direction of the machine.

Once the strands have been prepared, they are held in place, for example by means of a tool, for example a clamp. There may be at least one free end of a strand that is higher than the set of free ends of the other strands of the electrical conductor(s). In one embodiment, there are two free ends of strands that are higher than the set of free ends of the other strands of the electrical conductor(s). They can be adjacent. The distance d between these two strands of greater height is therefore zero. Alternatively, they are not adjacent. In one embodiment, the free end(s) of strands of one or more electrical conductors that are higher than all the free ends of the other strands of the electrical conductor(s) are adjacent to the plane separating two electrical conductors to be welded. As a variant, the free end(s) of strands of one or more electrical conductors that are higher than all the free ends of the other strands of the electrical conductor(s) are located on a lateral edge of the set of strands of the electrical conductor(s) to be welded.

The distance d can be between 5% and 50% of the width L of the section to be welded, or even between 10% and 40%, better still between 15% and 23% of the width L of the section to be welded, for example 19%+/−4%. "Width L of the section to be welded" means the sum of the thicknesses e of the strands to be welded.

Advantageously, all the strands of one or more electrical conductors to be welded together are arranged symmetrically with respect to a plane of symmetry. In one embodiment, a plane of symmetry is a plane orthogonal to the radial axis of the machine. The plane of symmetry can be contained in the plane separating two electrical conductors.

The free ends of the strands of one or more electrical conductors to be welded together are for example prepared so that all the free ends of the strands have the general shape of a step pyramid. The step pyramid can be regular. In other words, the distance d between two free ends of adjacent strands is constant. Alternatively, the step pyramid can be irregular. In other words, the distance d between two free ends of adjacent strands is not constant.

Alternatively, the strands are prepared so that the assembly has a triangular profile.

Alternatively, the strands are prepared so that the assembly has the shape of a staircase.

The strands can also be prepared so that the assembly has a bevel shape. Also alternatively, the strands are prepared such that the assembly exhibits a piecewise affine function profile. In this case, there are at least two obliquely machined strands with a distinct slope. The affine function representing the profile can be increasing then decreasing or strictly increasing or strictly decreasing.

Finally, the strands can be prepared so that all of the strands are arranged in the form of crenellations.

Melting step (b) can be carried out by means of a heat source, in particular a laser or an electric arc, for example an electric arc produced by means of a tungsten electrode. The welding process using a tungsten electrode can be TIG ("Tungsten Inert Gas") welding. In this welding method, the electric arc is produced from a tungsten electrode and plasma. Using a heat source makes it possible to melt the free ends of the strands without degrading the assembly of the strands of the electrical conductor(s). A single heat source can be used to produce the same weld. Alternatively, several heat sources can be used to produce the same weld.

In one embodiment, the heat source first heats the free end(s) of the strands of greater height, during melting step (b). The tip of the strands of the electrical conductor(s) is the zone containing the free end(s) of the strands of greater height. Heating the tip of the strands of the electrical conductor(s) first makes it possible, in particular, to benefit from the stress concentration of the strands of the electrical conductor(s). Stress concentration allows heat to accumulate in the tip of the strands of the electrical conductor(s) and facilitates the transmission of this heat by thermal conduction to the other strands of the electrical conductor(s). The tip of the electrical conductor melts first, then the adjacent strands melt by thermal conduction, giving the weld a rounded shape. Stress concentration is particularly advantageous when the strands are arranged in a step pyramid. In one embodiment, only the tip of the electrical conductor(s) is heated using the heat source.

In addition, heating the free end(s) of the strands of greater height first during melting step (b) allows the melted material to flow toward the strands adjacent to the strands of greater height and thus to facilitate the formation of a layer of melted material having a convex portion.

Alternatively or additionally, the heat source can be moved in steps so as to produce the welds of the peripheral strands, on either side, to form and finalize the entire weld. The heat source begins for example by heating the tip of the strands of the electrical conductor(s) of greater height, then those to their right, then the strands to the left, passing through the center. Alternatively, the heat source begins for example by heating the tip of the strands of the electrical conductor(s) of greater height, then the strands to the left, then those to their right, passing through the center. Alternatively, the heat source sweeps the free ends of the strands of the electrical conductor(s) several times.

Stator

Another object is, independently of or in combination with the above, the provision of a stator of a rotating electrical machine, comprising a stator mass comprising notches, each notch receiving one or more electrical conductors, an electrical conductor comprising one or more strands each having a free end, the free ends of the strands of one or more electrical conductors being welded together by the welding method as described above, the layer of material having melted in particular having a variable thickness of greater thickness between 100% and 300% of the thickness of a strand, better still between 120% and 200% of the thickness of a strand.

Another object is, independently of or in combination with the above, the provision of a stator of a rotating electrical machine, comprising a stator mass comprising notches, each notch receiving one or more electrical conductors, an electrical conductor comprising one or more strands each having a free end, the free ends of the strands of one or more electrical conductors being welded together by the welding without addition of material.

Since the welding is done without addition of material, the welded portion has a uniform metallurgy. Welding without adding material can make it possible to weld the strands of the same electrical conductor together. It can also allow two single-strand electrical conductors to be welded together. It can also allow two electrical conductors to be welded together that each have several strands, by welding together the strands of the two electrical conductors. For example, in the case where each electrical conductor has three strands, the six strands of two electrical conductors can be welded together. It can also allow more than two electrical conductors to be welded together. Such welding without adding material allows the quantity of energy required for welding to be limited, namely the quantity of energy transferred per unit of weld length throughout the movement of the heat source. By limiting the welding energy, the amount of energy accumulated in the free ends of the strands or electrical conductors to be welded is reduced. This reduces the risk of damage to the free ends of the strands or conductors. The risk of destruction of the electrical conductors by energy accumulation in the ends to be welded is also reduced.

Preferably, all the free ends of the strands of the electrical conductors of the same notch are welded together to form a single weld.

Preferably, the layer of melted material extends over substantially the entire width L of the section to be welded.

In one embodiment, the welding is performed at the exit of the notch.

Advantageously, the outer surface of the layer of melted material has a convex portion. In particular, the outer surface of the weld may have the shape of a dome. The convex shape of the outer surface of the weld allows the risks of hot spot formation to be limited during the passage of current in the stator, compared with shapes of the outer surface of the weld having sharper angles. In the case where a stator impregnation step is implemented, the convex shape of the outer surface of the weld makes it possible to promote the uniform distribution of the impregnation material on the outer surface of the weld. In particular, the impregnation material can be distributed more evenly than in the case where the outer surface of the weld is substantially flat.

Advantageously, the layer of melted material has a variable thickness h, of larger thickness greater than 1 mm, better still greater than 1.5 mm, for example between 2 mm and 5 mm. "Thickness of the layer of melted material" means the distance between the outer surface of the weld and the part of the free ends of the strands that has not melted. The greatest thickness h is, for example, at least greater than 50% or even 80% of the distance between the free end of the strand of greater height and the free end of the strand of smaller height. Preferably, the greatest thickness h is equal to the distance between the free end of the strand of greater height and the free end of the strand of smaller height.

The layer of melted material can have a variable thickness h of greater thickness between 100% and 300% of the thickness e of a strand, better still between 120% and 200% of the thickness e of a strand. The area of the current flow section between two electrical conductors welded using the method is greater than when the strands of the electrical conductors are welded in a configuration with raised edges. This increase in the area of the section through which the electric current passes through the weld allows good electrical conductivity to be ensured between the electrical conductors. The smallest current flow section in the weld can for example be located in the plane separating two electrical conductors.

Advantageously, all the electrical conductors that have a free end located at the same circumferential position about the axis of rotation of the machine, regardless of their radial position, are welded together using the method. Alternatively, part of the electrical conductors are electrically connected by welding without adding material and the rest of the electrical conductors are electrically connected by welding with adding material.

Winding

The electrical conductors can form a single winding, in particular whole or fractional. "Single winding" means that the electrical conductors are electrically connected together in the stator, and that the connections between the phases are made in the stator, and not outside the stator, for example in a terminal box.

The electrical conductors can form a distributed winding. The winding is not concentrated or wound on a tooth.

The winding is whole or fractional. The winding can be whole in pitch with or without shortening, or, in a variant, fractional. In one embodiment, the electrical conductors form a fractional winding, in particular with a shortened pitch. The number of notches in the stator can be between 18 and 96, better still between 30 and 84, being for example 18, 24, 27, 30, 36, 42, 45, 48, 54, 60, 63, 72, 78, 81, 92, 96 or even more preferably being 60 or 63. The number of poles of the stator can be between 2 and 24, or even between 4 and 12, for example 6 or 8.

The winding may comprise a single winding path or several winding paths. The current of the same phase flows by winding path in an "electrical conductor." "Winding path" means all the electrical conductors of the machine that are traversed by the same electric current of the same phase. These electrical conductors can be connected to each other in series or in parallel or in series-parallel. In the case where there is only one channel, the electrical conductors are connected in series. In the case where there are several channels, the electrical conductors of each channel are connected in series, and the channels are connected in parallel.

Electrical Conductors

The current of the same phase of a winding path flows in an "electrical conductor." Several electrical conductors in series form a "coil." The number of coils per phase is at most equal to the number of poles of the stator or to the number of pairs of poles.

In each notch there can be one or more layers. "Layer" refers to the series electrical conductors belonging to the same phase arranged in the same notch. In each layer of a notch, there are the electrical conductors of the same phase. In general, the electrical conductors of a stator can be distributed in one layer or in two layers. When the electrical conductors are distributed in a single layer, each notch only houses electrical conductors of the same phase.

The electrical conductors can be divided into only two layers. In this case, one or more notches can house electrical conductors of two different phases. This is always the case for a winding with shortened pitch. In one embodiment, the winding may not comprise more than two layers. In one embodiment, it is notably devoid of four layers.

At least a first electrical conductor housed in a first notch can be electrically connected to a second electrical conductor housed in a second notch, at the outlet from said notches.

"Electrically connected" means any type of electrical connection, in particular by welding, with different possible welding methods, in particular laser, TIG, induction, friction, ultrasound, vibrations or brazing, or by mechanical clamping, in particular by crimping, screwing or riveting for example.

The first and second notches are preferably non-consecutive.

The first and second electrical conductors can be electrically connected to the outlet of the first and second notches, that is to say that the electrical connection is formed on the electrical conductors just after their exit from the two notches, at an axial end of the stator mass. The electrical connection can be made in a plane perpendicular to the axis of rotation of the machine. The plane of the electrical connection can be less than 60 mm away from the stator mass, better still less than 40 mm away, for example 27 mm or 38 mm approximately.

A majority of the electrical conductors housed in a first notch can each be electrically connected to a respective second electrical conductor housed in a second notch, at the outlet of said notches. At least one notch, better still a majority of the notches, or even more than half of the notches, better still more than two-thirds of the notches, or even all of the notches, may comprise first electrical conductors each electrically connected to a respective second electrical conductor housed in a second notch, at the outlet of said notches.

In one embodiment, all the electrical conductors having a free end located at the same circumferential position about the axis of rotation of the machine, regardless of their radial position, are electrically connected together.

The first and second electrical conductors can each comprise an oblique portion. The oblique portions may extend in a circumferential direction about the axis of rotation of the machine. The two oblique portions can be configured to converge toward one another and thus allow the electrical connection to be made.

An electrical conductor can comprise two oblique portions, one at each of its two ends. The two oblique portions of the same electrical conductor can extend in opposite directions. They can diverge from each other. They can be symmetrical with respect to each other.

A majority of the electrical conductors can comprise one or more oblique portions as described above.

The electrical conductors can be arranged in the notches in a distributed manner. "Distributed" means that the outgoing and return electrical conductors are each housed in different and non-consecutive notches. At least one of the electrical conductors can pass successively through two non-consecutive notches. The electrical conductors can be arranged in a row in the notches. "Row" means that the electrical conductors are not arranged in the notches in bulk, but in an orderly manner. They are stacked in the notches in a non-random manner, for example arranged in a row of electrical conductors aligned in the radial direction. Alternatively, they are arranged in a row of electrical conductors aligned in the circumferential direction about the axis of rotation of the machine. In one embodiment, the strands of one or more electrical conductors are arranged in a row of strands of electrical conductors aligned in the radial direction. Alternatively, they are arranged in a row of strands of electrical conductors aligned in the circumferential direction about the axis of rotation of the machine.

The electrical conductors may have a generally rectangular cross-section, in particular with rounded edges. The circumferential dimension of an electrical conductor can correspond substantially to the width of a notch. Thus, a notch may comprise only a single electrical conductor in its width. The width of the notch is measured in its circumferential dimension about the axis of rotation of the machine.

The electrical conductors can be adjacent to each other by their long sides, otherwise called the flat.

Optimizing the stack can make it possible to place a greater quantity of electrical conductors in the notches, and therefore to obtain a stator of greater power at a constant volume.

Each notch can comprise from 2 to 36 electrical conductors, in particular from 2 to 24, better still from 2 to 12 electrical conductors. Each notch may comprise from two to eight electrical conductors, in particular from two to four electrical conductors, for example two or four electrical conductors. In a variant embodiment, each notch comprises two electrical conductors. In another variant embodiment, each notch comprises four electrical conductors.

Pins

At least some electrical conductors, if not a majority of the electrical conductors, can be in the form of U or I pins. The pin can be U-shaped ("U-pin") or straight, being I-shaped ("I-pin").

The pin and flat electrical conductors increase the filling coefficient of the notch, making the machine more compact. Owing to a high filling coefficient, the thermal exchanges between the electrical conductors and the stator mass are improved, which makes it possible to reduce the temperature of the electrical conductors inside the notches.

Furthermore, the manufacture of the stator can be facilitated by the electrical conductors in pin form. In addition, the winding with pins can be modified easily by changing only the connections between the pins at the coil heads. Finally, since the pins do not need to have open notches, it is possible to have closed notches that make it possible to hold the pins, and it is therefore possible to eliminate the step of inserting stator shims.

Electrical conductors, or even a majority of electrical conductors, extend axially in the notches. The electrical conductors can be introduced into the corresponding notches by one or both axial ends of the machine.

An I-shaped electrical conductor has two axial ends each placed at one of the axial ends of the stator. It passes through a single notch, and can be welded at each of its axial ends to two other electrical conductors, at the axial ends of the stator. The stator may for example comprise six or twelve electrical conductors in the shape of an I, the other electrical conductors possibly all being in the shape of a U.

A U-shaped electrical conductor has two axial ends both placed at one of the axial ends of the stator. It passes through two different notches, and can be welded at each of its axial ends to two other electrical conductors, at the same axial side of the stator. The bottom of the U is placed on the other axial side of the stator.

Strands

Each electrical conductor comprises one or more strands (also called "wire"). "Strand" refers to the most basic unit for electrical conduction. A strand can be of round cross-section, which may then be called "wire," or may be flat. The flat strands can be shaped into pins, for example U or I pins. Each strand is coated with an insulating enamel.

The fact that each notch can comprise several electrical conductors and/or several strands makes it possible to minimize losses by induced currents, or Joule AC losses, which vary with the square of the supply frequency, which is particularly advantageous at high frequency and when the operating speed is high. It is thus possible to obtain better efficiency at high speed.

The presence of closed notches can make it possible to obtain a reduction in the leakage fluxes seen by the electrical conductors, which leads to a reduction in eddy current losses in the strands.

In one embodiment, each electrical conductor may comprise several pins, each forming a strand, as explained above. All the strands of the same electrical conductor can be electrically connected to each other at the outlet of the notch. The strands electrically connected to each other are placed in short circuit. The number of strands electrically connected together may be greater than or equal to 2, being for example between 2 and 12, being for example 3, 4, 6 or 8 strands.

Several strands can form the same electrical conductor. The same electric current of the same phase flows in all the strands of the same electrical conductor. All the strands of the same electrical conductor can be electrically connected to each other, in particular at the outlet of the notch. All the strands of the same electrical conductor can be electrically connected to each other at each of their two axial ends, in particular at the outlet of the notch. They can be electrically connected in parallel.

All the strands of all the electrical conductors having a free end located at the same circumferential position about the axis of rotation of the machine, regardless of their radial position, can be electrically connected to one another.

In another embodiment, each electrical conductor comprises three strands.

In the case where a notch comprises two electrical conductors, a notch can therefore house six strands, for example, distributed between the two electrical conductors.

In a variant, a notch comprises four electrical conductors. Each electrical conductor can comprise two strands. The notch then houses eight strands, distributed between the four electrical conductors.

The strands can be positioned in the notch so that their circumferential dimension around the axis of rotation of the machine is greater than their radial dimension. Such a configuration allows a reduction in eddy current losses in the strands.

A strand may have a width of between 1 and 5 mm, for example of the order of 2.5 or 3 mm. The width of a strand is defined as its dimension in the circumferential direction about the axis of rotation of the machine.

A strand may have a height of between 1 and 4 mm, for example of the order of 1.6 or 1.8 mm. The height of a strand is defined as its thickness in the radial dimension.

A ratio of the width of a strand to its height can be between 1 and 2.5, better still between 1.2 and 2, or even more preferably between 1.4 and 1.8, being for example 1.56 or 1.66. Such a ratio allows a reduction in eddy current losses in the strands.

The electrical conductors can be made of copper or aluminum.

Insulators

The electrical conductors are electrically insulated from the outside by an insulating coating, in particular an enamel. The electrical conductors can be separated from the walls of the notch by an insulator, in particular by at least one insulating sheet. Such a sheet insulator allows better insulation of the electrical conductors with respect to the stator mass. Using closed notches can make it possible to improve the retention of the insulators around the electrical conductors in the notches.

Notches

The notches can be open or at least partially closed. A partially closed notch makes it possible to provide an opening at the air gap, which can be used, for example, to install the electrical conductors for filling the notch. A partially closed notch is in particular formed between two teeth that each comprise pole shoes at their free end, which close the notch at least in part.

In a variant, the notches can be completely closed. The term "fully closed notch" denotes notches which are not open radially toward the air gap.

The presence of the closed notches makes it possible to improve the performance of the electrical machine in terms of the quality of the magnetic field in the air gap, by minimizing the harmonic content and the eddy current losses in the electrical conductors, and the leakage fluxes in the notches, as well as the fluctuations of the magnetic field in the air gap and heating of the machine. In addition, the presence of these closed notches makes it possible to improve the mechanical rigidity of the stator, by mechanically strengthening the stator and by reducing vibrations.

The stator mass can be produced by stacking magnetic sheets, the notches being formed by cutting the sheets. The stator mass can also be produced by cutting from a mass of sintered or agglomerated magnetic powder.

Machine and Rotor

Also disclosed is a rotating electrical machine, such as a synchronous motor or a synchronous generator, comprising a stator as defined above. The machine can be synchronous or asynchronous. The machine can be a reluctance machine. It can constitute a synchronous motor.

The maximum speed of rotation of the machine can be high, being for example greater than 10,000 rpm, better still greater than 12,000 rpm, being for example of the order of 14,000 rpm to 15,000 rpm, or even 20,000 rpm or 25,000 rpm. The maximum speed of rotation of the machine may be less than 100,000 rpm, or even 60,000 rpm, or even less than 40,000 rpm, better still less than 30,000 rpm.

The rotating electrical machine may comprise a rotor. The rotor can be a permanent magnet rotor, with surface or buried magnets. The rotor can be in flux concentration. It can comprise one or more layers of magnets arranged in an I, a U or a V. In a variant, it may be a wound or squirrel cage rotor, or a variable reluctance rotor.

The diameter of the rotor may be less than 400 mm, better still less than 300 mm, and greater than 50 mm, better still greater than 70 mm, for example between 100 and 200 mm.

The rotor may comprise a rotor mass extending along the axis of rotation and arranged around a shaft. The shaft may comprise torque transmission means for driving the rotor mass in rotation.

The rotor may or may not be cantilevered.

The machine can be inserted alone in a housing or inserted in a gearbox housing. In this case, it is inserted in a housing which also houses a gearbox.

Manufacturing Method

Lastly, a method for manufacturing a stator as described above is disclosed. The method can comprise the following step:

(c) positioning the electrical conductors in the notches of the stator, this positioning step (c) taking place before the abovementioned preparation (a) and melting (b) steps.

In another embodiment, the positioning step (c) can be carried out after the preparation step (a) and before the melting step (b).

In accordance with an aspect of the method, the method for manufacturing a stator for a rotating electrical machine, comprises the following steps:

preparing a plurality of strands of one or more electrical conductors to be welded such that at least the free ends of adjacent strands are axially offset, by a non-zero distance d.

melting the free ends of the strands thus arranged in order to weld them without addition of material.

positioning the electrical conductors in the notches of the stator.

The positioning step (c) can take place before the preparation (a) and melting (b) steps mentioned above. In another embodiment, the positioning step (c) can be carried out after the preparation step (a) and before the melting step (b).

At least one electrical conductor, or even a majority of the electrical conductors, introduced into the notches are in the form of a U-shaped pin. They can be shaped prior to their introduction into the notches. All the electrical conductors in the form of a U-shaped pin can be shaped, simultaneously or successively, then introduced into the stator mass simultaneously or successively.

The shaping may comprise a first step of assembling the strands of the same electrical conductor.

The same U-shaped electrical conductor can be placed in two different non-consecutive notches of the stator mass of the stator. In the case where an electrical conductor is U-shaped, it can be welded to two other electrical conductors on the same side of the machine.

Two I-shaped electrical conductors can be connected together beforehand in two different non-consecutive notches of the stator mass of the stator. In the case where an electrical conductor is I-shaped, it can be welded to two other electrical conductors on two opposite sides of the machine.

It is possible to electrically connect all the electrical conductors together that have a free end located at the same circumferential position about the axis of rotation of the machine, regardless of their radial position.

BRIEF DESCRIPTION OF THE DRAWINGS

The method and stator made in accordance with the method may be better understood upon reading the following detailed description, of non-limiting embodiments thereof, and on examining the appended drawings, in which.

DETAILED DESCRIPTION

FIGS. 1 to 5 show a stator 2 of a rotating electrical machine 1 also comprising a rotor, not shown. The stator makes it possible to generate a rotating magnetic field for driving the rotating rotor, in the context of a synchronous motor, and in the case of an alternator, the rotation of the rotor induces an electromotive force in the electrical conductors of the stator.

The examples illustrated below are schematic and the relative dimensions of the various component elements have not necessarily been observed.

The stator 2 comprises electrical conductors 22, which are arranged in notches 21 formed between teeth 23 of a stator mass 25. The notches 21 are closed.

The electrical conductors 22 comprise strands 33. The strands 33 have a generally rectangular cross-section, in particular with rounded corners. In the described example, the strands 33 are superimposed radially in a single row.

Figure 1:
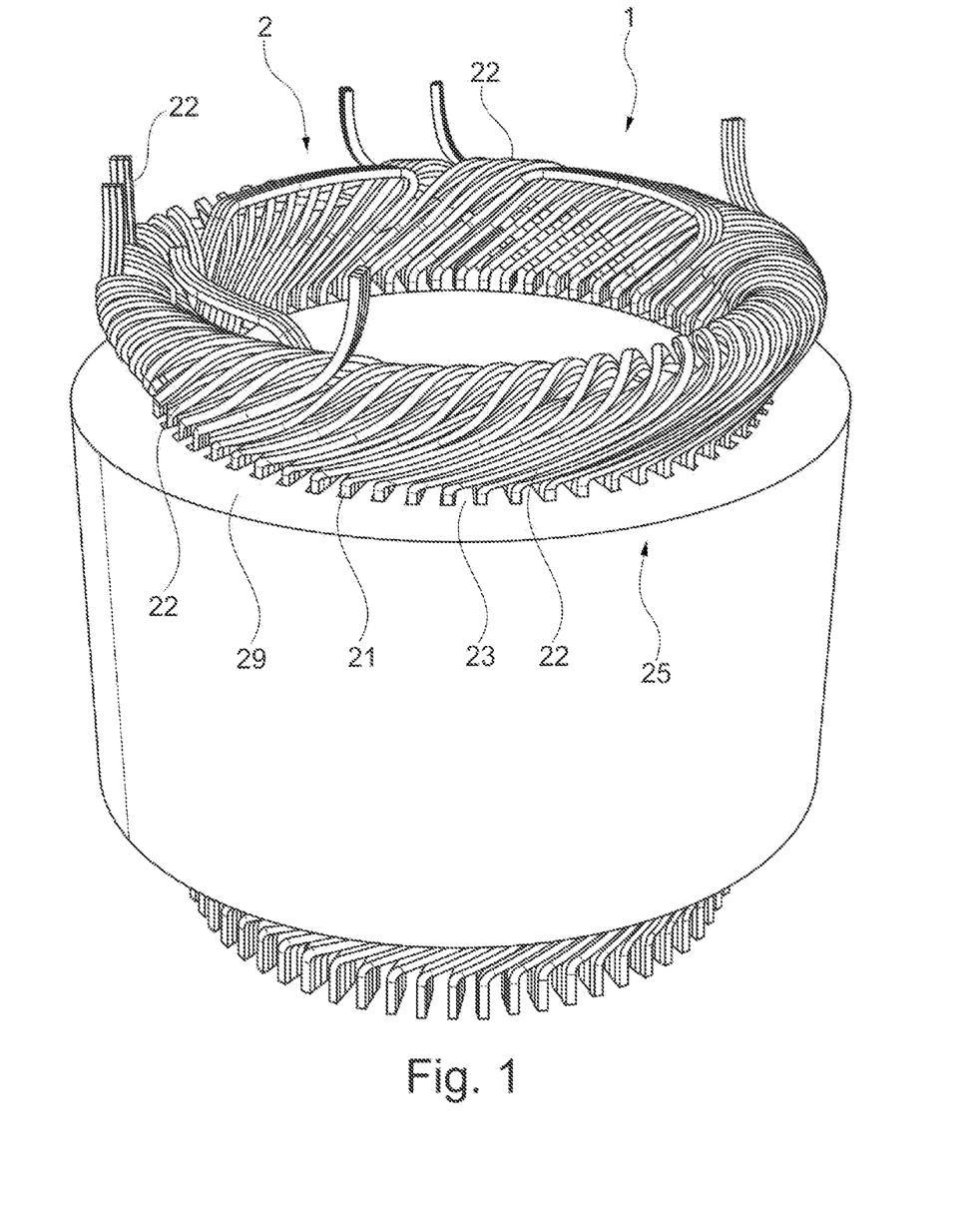
FIG. 1 is a schematic, partial perspective view of a stator.
Figure 2:
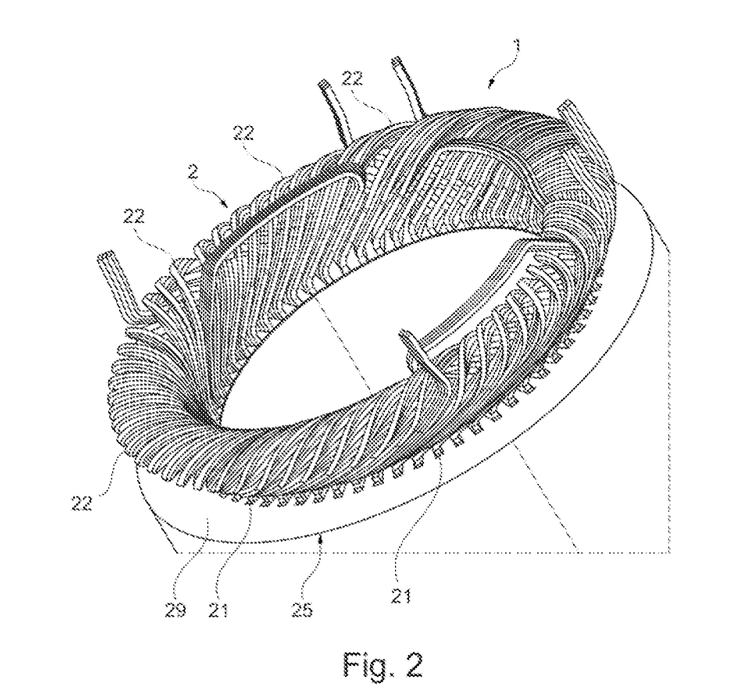
FIG. 2 is a schematic, partial perspective view of the stator of FIG. 1.
Figure 3:
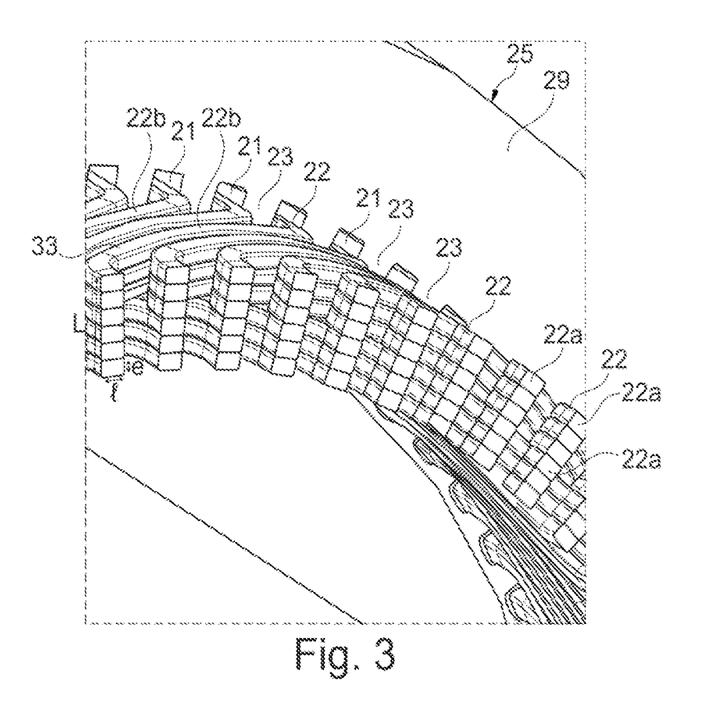
FIG. 3 is a detail perspective view of the stator of FIG. 1.

As shown in FIG. 3, thickness e of a strand 33 is its dimension in the radial direction of the machine. The width $\ell$ of a strand 33 is defined as its dimension in the circumferential direction about the axis of rotation of the machine. The width L of the section to be welded corresponds to the sum of the thicknesses e of each strand.

The electrical conductors 22 are for the most part in the form of pins, namely U or I pins, and which extend axially in the notches. A first electrical conductor housed in a first notch is electrically connected to a second electrical conductor housed in a second notch, at the outlet from said notches.

The first and second notches are non-consecutive. In the illustrated example, they are separated by 7 other notches. In a variant, the first and second notches are separated by 3, 4, 5, 6, 8, 9, 10 or 11 other notches, for example.

The electrical connection is formed on the electrical conductors just after they exit the two notches, at one axial end of the stator mass. The two electrical conductors each comprise an oblique portion 22b, which converge toward one another. The electrical connection between two conductors is done in a plane perpendicular to the axis of rotation of the machine, causing the free ends 22a of the strands of the two electrical conductors to melt.

In particular, FIG. 3 shows the free end surfaces 22a of the strands of the first and second electrical conductors intended to be prepared such that at least the free ends 22a of adjacent strands are axially offset by a non-zero distance d.

In the described embodiment, the preparation takes place by machining the strands.

Figure 4:
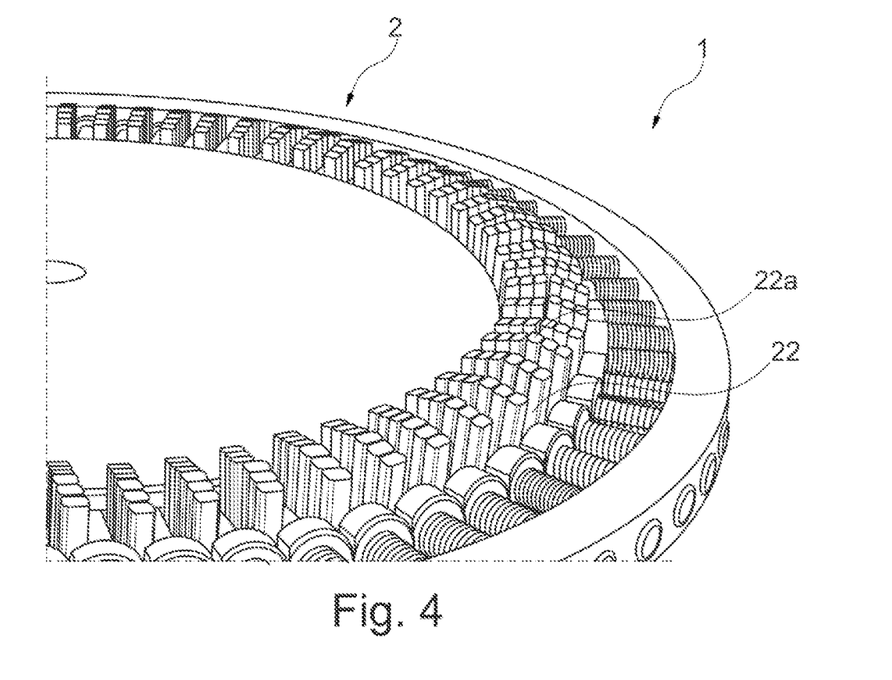
FIG. 4 is a partial view of the stator of FIG. 1 after preparation of the strands.

FIG. 4 illustrates the free end surfaces 22a of the strands of the first and second electrical conductors 22 after a machining step. The end surfaces 22a are at different heights as a result of this machining step.

Figure 5:
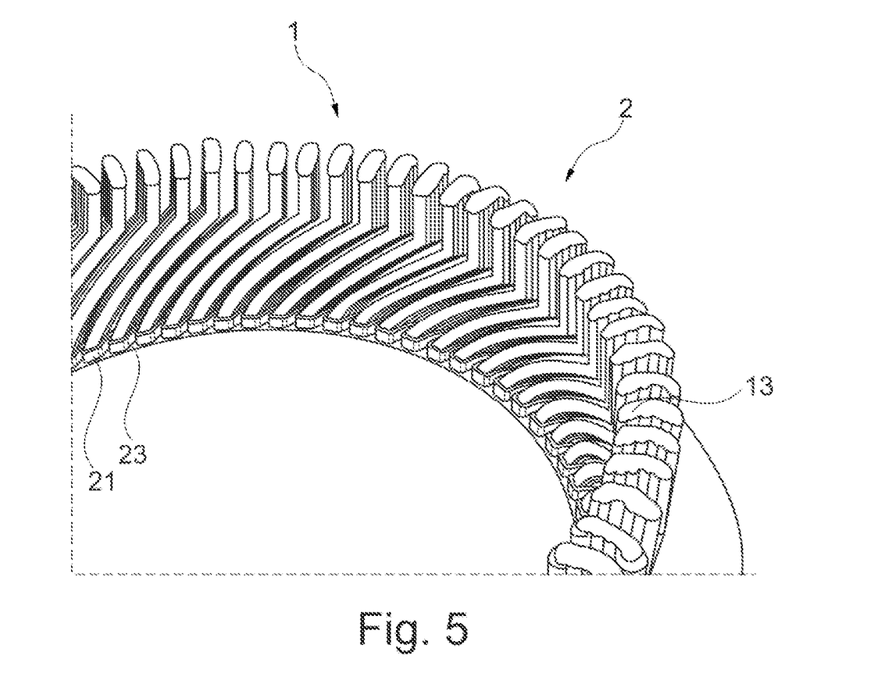
FIG. 5 is a partial view of the stator of FIG. 1 after melting of the free ends of the strands.
Figure 6:
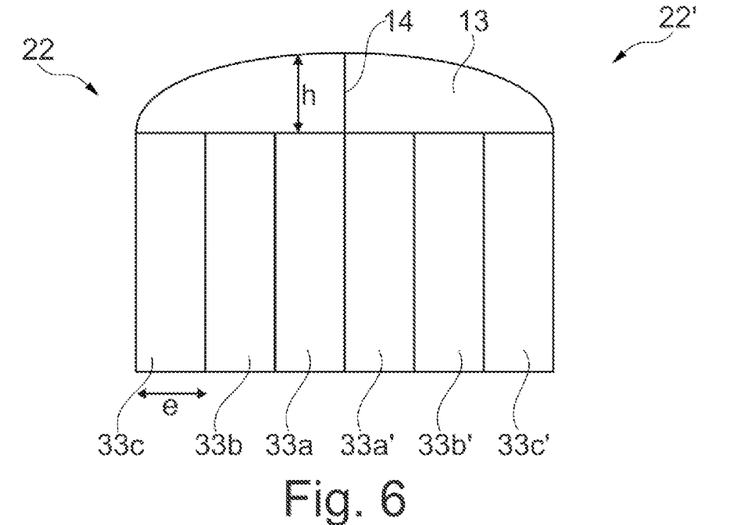
FIG. 6 is a sectional view of the strands of two electrical conductors welded together.

FIGS. 5 and 6 show the stator 2 after the step of melting the free ends 22a of the strands. Two electrical conductors 22 and 22' have been welded together. The electrical conductor 22 comprises three strands 33a, 33b, 33c and the electrical conductor 22' comprises three strands 33a', 33b', 33c'. A layer of melted material 13 ensures the electrical connection between the two electrical conductors 22 and 22'. The outer surface of this layer of melted material 13 is convex. In the example shown in FIG. 6, it is in the shape of a dome. The thickness h of the layer of melted material 13 is of the order of 3 mm. The smallest current flow section 14 is contained in the plane that separates the strands 33a and 33a'.

In order to implement the welding method, the strands can be prepared according to one of the arrangements illustrated in FIGS. 7a to 9.

Figure 7A:
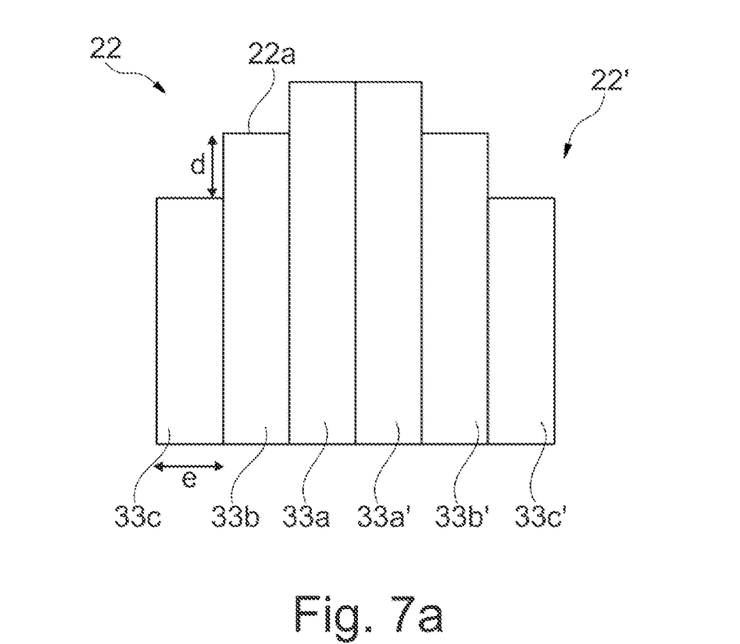
FIG. 7a is a sectional view of the strands of two electrical conductors to be welded arranged to have the shape of a regular step pyramid.

In the embodiment shown in FIG. 7a, the free ends of the strands of the two electrical conductors 22, 22' to be welded together are prepared so that all the free ends of the strands have the general shape of a step pyramid. The distance between two free ends 22a of two adjacent strands is denoted by d. In the illustrated embodiment, the electrical conductor 22 comprises three strands 33a, 33b, 33c and the electrical conductor 22' comprises three strands 33a', 33b', 33c'. The distance d between the free ends of the strands 33a and 33a' is zero. The distance d between the free ends of the strands 33a and 33b, 33b and 33c, 33a' and 33b' and 33b' and 33c' is non-zero. The strands 33a and 33a' are the strands of greater height. The strands are prepared by being machined perpendicular to their axis of elongation. The greatest thickness h of the layer of melted material that can be obtained when the strands are prepared according to this embodiment is equal to twice the value of the distance d.

Figure 7B:
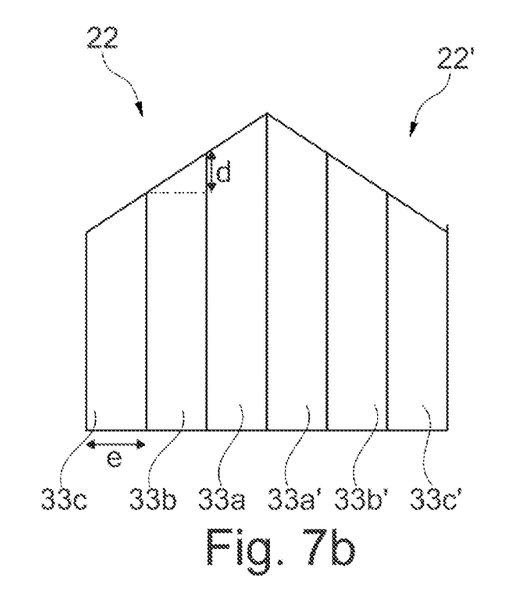
FIG. 7b is a view similar to FIG. 7a of an alternative embodiment.

In the embodiment shown in FIG. 7b, the strands are prepared so that the assembly has a triangular profile. The electrical conductors 22, 22' have been machined obliquely. In the illustrated embodiment, the two electrical conductors 22, 22' are machined along the same slope. The greatest thickness h of the layer of melted material that can be obtained when the strands are prepared according to this embodiment is equal to twice the value of the distance d. In an embodiment that is not shown, the two electrical conductors 22, 22' are machined along two different slopes.

Figure 7C:
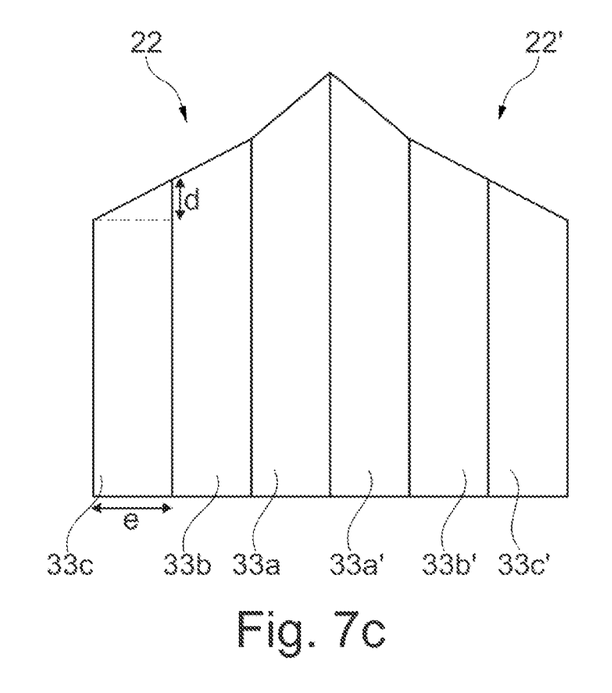
FIG. 7c is a view similar to FIG. 7a of an alternative embodiment.

In the embodiment illustrated in FIG. 7c, the strands are prepared such that the assembly exhibits a piecewise affine function profile. The affine function that represents the profile is increasing, then decreasing. Each strand is machined obliquely in isolation. Thus, each strand can be machined with a different slope from the others. The strands 33a, 33b, 33c of the electrical conductor 22 are machined in a direction opposite the strands 33a', 33b', 33c' of the electrical conductor 22'. The difference in height between the free ends 22a of the highest strands 33a and 33a' and the free ends 22a of the lowest strands 33c and 33c' is between 1 and 2 mm. The greatest thickness h of the layer of melted material that can be obtained when the strands are prepared according to this embodiment is equal to twice the value of the distance d.

Figure 8A:
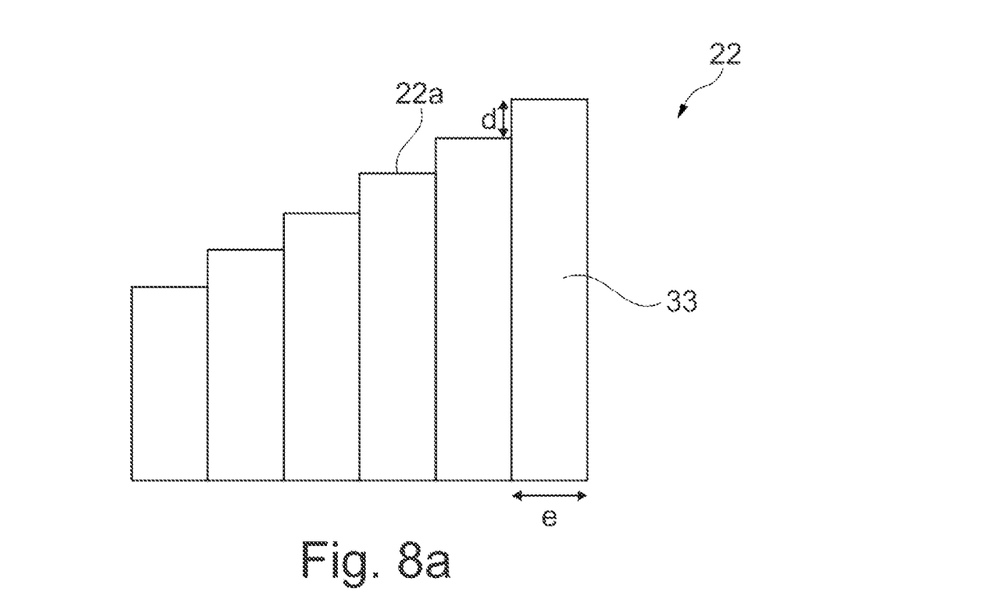
FIG. 8a is a view similar to FIG. 7a of an alternative embodiment.

In the embodiment illustrated in FIG. 8a, the strands are prepared so that the assembly has the shape of a staircase. In this embodiment, the free end 22a of a strand is offset by a distance d with respect to the adjacent strand. In the illustrated example, the distance d is constant. The greatest thickness h of the layer of melted material that can be obtained when the strands are prepared according to this embodiment is equal to five times the value of the distance d.

Figure 8B:
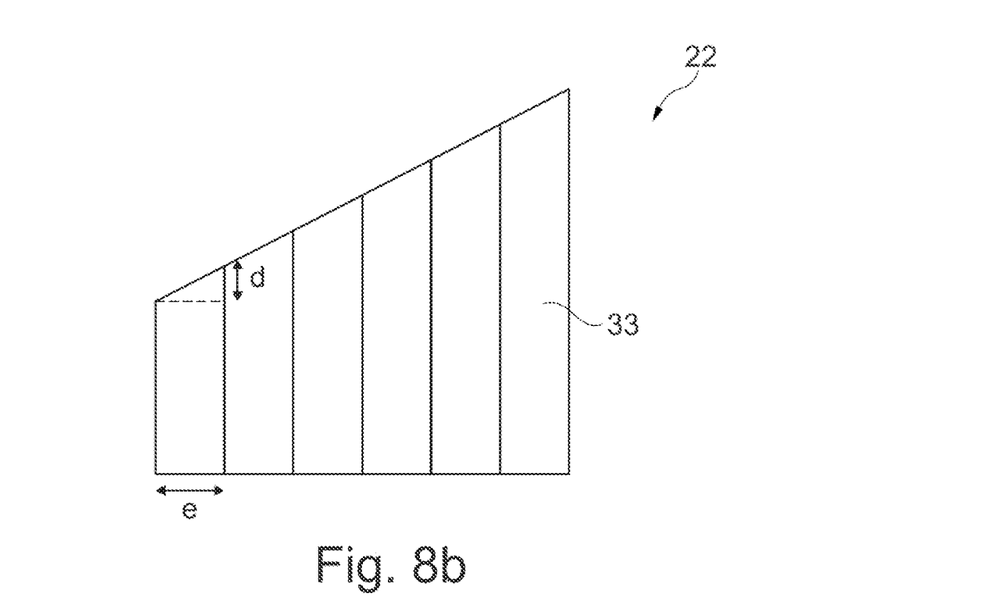
FIG. 8b is a view similar to FIG. 7a of an alternative embodiment.

In the embodiment illustrated in FIG. 8b, the strands are prepared so that the assembly has the shape of a bevel. In this case, all the strands of the two electrical conductors 22 and 22' are machined obliquely in the same direction. All the free ends 22a then have the same slope. The greatest thickness h of the layer of melted material that can be obtained when the strands are prepared according to this embodiment is equal to five times the value of the distance d.

Figure 8C:
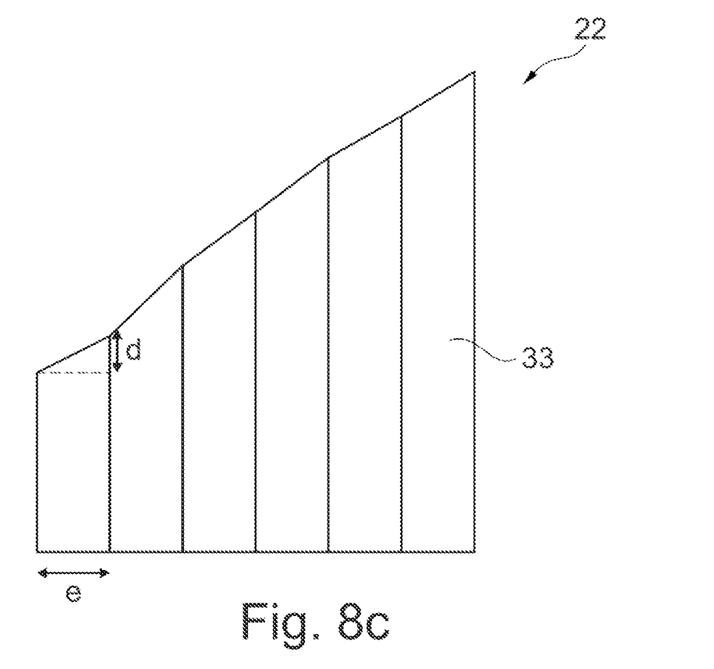
FIG. 8c is a view similar to FIG. 7a of an alternative embodiment.

In the embodiment illustrated in FIG. 8c, the strands are prepared such that the assembly exhibits a piecewise affine function profile. The affine function representing the profile is strictly increasing. In an embodiment that is not shown, it is strictly decreasing. Each free end 22a of the strand is machined obliquely and in isolation. Thus, each strand can be machined with a different slope from the others. All the free ends 22a of the strands are machined in the same direction. The greatest thickness h of the layer of melted material that can be obtained when the strands are prepared according to this embodiment is equal to five times the value of the distance d.

Figure 9:
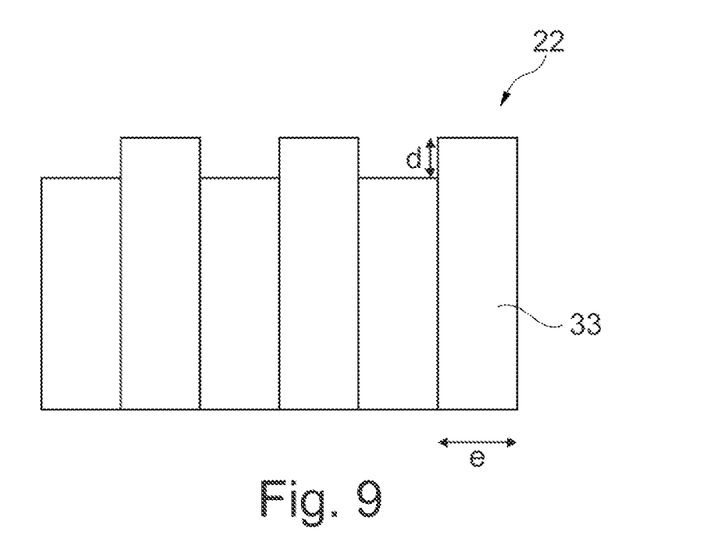
FIG. 9 is a view similar to FIG. 7a of an alternative embodiment.

In one embodiment shown in FIG. 9, the strands can be prepared so that all of the strands are arranged in the form of crenellations. The greatest thickness h of the layer of melted material that can be obtained when the strands are prepared according to this embodiment is equal to one times the value of the distance d.

Of course, the invention is not limited to the embodiments that have just been described, and the rotor associated with the described stator can be wound, with a squirrel cage or with permanent magnets, or else with variable reluctance.

In addition, the strands can be prepared in strand arrangements other than those illustrated.

The expression "comprising a" should be understood as being synonymous with "comprising at least one."

The invention claimed is:

1. A method for welding a plurality of strands of one or more electrical conductors, each strand having a free end, the method comprising at least the following steps:
   (a) preparing the strands to be welded such that at least the free ends of adjacent strands are axially offset along the axis of elongation of the strands, by a non-zero distance d,
   (b) melting the free ends of the strands thus arranged in order to weld them without addition of material,
   wherein, step (b) forms a layer of melted material having a variable thickness (h) of greater thickness between 100% and 300% of a thickness (e) of a strand.

2. The method according to claim 1, wherein the preparing step (a) is carried out by machining the strands to be welded.

3. The method of claim 2 wherein the distance (d) is between 10% and 100% of the thickness (e) of a strand or between 15% and 80% of the thickness (e) of the strand.

4. The method according to claim 2, wherein the distance (d) is between 5% and 120% of the thickness (e) of a strand.

5. The method according to claim 1, wherein the distance (d) is between 5% and 50% of a width (L) of a section to be welded.

6. The method of claim 5 wherein the distance (d) is between 10% and 40% of the width (L) or between 15% and 23% of the width (L).

7. The method according to claim 1, wherein all the strands of one or more electrical conductors to be welded together are arranged symmetrically with respect to a plane of symmetry.

8. The method according to claim 1, wherein free ends of the strands of one or more electrical conductors to be welded together are prepared so that all the free ends of the strands have the general shape of a step pyramid.

9. The method according to claim 1, wherein the melting step (b) is carried out by means of a heat source.

10. The method according to claim 9, wherein the heat source first heats the free end(s) of the strands of greater height during melting step (b).

11. The method of claim 1 wherein the layer of material having melted has a thickness of between 120% and 200% of the thickness (e) of a strand.

12. A method for welding a plurality of strands of one or more electrical conductors, comprising at least the following steps:
    (a) preparing the strands to be welded such that at least the free ends of adjacent strands are axially offset, along the axis of elongation of the strands, by a non-zero distance d and such that all the strands of one or more electrical conductors to be welded together are arranged symmetrically with respect to a plane of symmetry, and
    (b) melting the free ends of the strands thus arranged in order to weld them without addition of material.

13. A stator of a rotating electrical machine, comprising a stator mass comprising notches, each notch receiving one or more electrical conductors, an electrical conductor comprising one or more strands each having a free end, the free ends of the strands of one or more electrical conductors being welded together by the welding method according to claim 12,
    the layer of melted material having a variable thickness (h) of greater thickness between 100% and 300% of the thickness (e) of a strand.

14. The stator according to claim 13, wherein an outer surface of the layer of melted material has a convex portion.

15. The stator according to claim 13, wherein the layer of melted material has a variable thickness (h), of larger thickness greater than 1 mm.

16. The method of claim 15 wherein the variable thickness (h) of the layer of melted material is greater than 1.5 mm.

17. The stator according to claim 13, wherein all the electrical conductors having a free end located at the same circumferential position about the axis of rotation of the machine, regardless of their radial position, are electrically connected together.

18. A rotating electrical machine comprising the stator according to claim 13 and a rotor.

19. A method for manufacturing a stator according to claim 13, the method comprising the following step:
    positioning the electrical conductors in the notches of the stator, this positioning step (c) taking place before the preparation (a) and melting (b) steps.

* * * * *